United States Patent Office 3,092,563
Patented June 4, 1963

3,092,563
POLYMERIZATION PROCESS
Peter Joseph Vermont James Agius, Abingdon, and Eric Bertram Evans, Steventon, England, assignors to Esso Research and Engineering Company, a corporation of Delaware
No Drawing. Filed Jan. 28, 1960, Ser. No. 5,096
Claims priority, application Great Britain Oct. 12, 1955
8 Claims. (Cl. 204—158)

This invention relates to the radiolysis of organic compounds and particularly to a polymerization process, to improved products obtained by this process, and to lubricating compositions containing these products. More particularly, this invention is concerned with polymers and copolymers produced by reacting monomeric mixtures, wherein one component is a nitrogenous base, in the presence of ionizing radiation. Such reaction products have great utility as detergents, viscosity index and pour-point improvers when used in fuel and lubricating oils.

This application is a continuation-in-part of our prior U.S. patent application, Serial No. 614,791, filed October 9, 1956, and now abandoned.

In the past, the polymerization of monomers including esters of unsaturated carboxylic acids, unsaturated esters of saturated carboxylic acids, unsaturated esters or hydrocarbons or their halogenated derivatives, unsaturated aromatic hydrocarbons, and nitriles of unsaturated carboxylic acids has been performed successfully. Examples of these classes respectively include esters of acrylic or fumaric acids, vinyl acetate, alphachlorovinyl acetate or vinyl chloride, styrene, acrylonitrile and fumaronitrile.

These substances usually polymerize readily in the presence of a catalyst at temperatures ranging from 30° C. to 100° C. A polymerization reaction may take from 2 to 48 hours, depending on the temperature and the presence or absence of a polymerization catalyst. Temperatures above 100° C. usually cause formation of tarry deposits which contaminate the polymeric product.

Polymerization catalysts used have been peroxy-type catalysts such as hydrogen peroxide, benzoyl peroxide, cumene hydroperoxide, lauroyl peroxide, urea hydroperoxide, and tert.-butyl perbenzoate, or persulphate type catalysts such as potassium or ammonium persulphate.

It was to be expected that the polymerization of unsaturated nitrogenous bases, particularly unsaturated amines including pyridines, or copolymers of such bases with other monomers would be carried out under conditions similar to those already known. However, this has now been discovered not to be so. Experiments performed to attempt to chemically polymerize monomer mixtures containing unsaturated amines were unsuccessful or were performed with difficulty. These experiments demonstrated that mixtures containing unsaturated nitrogenous bases are remarkably difficult to polymerize. Indeed, the base appeared to act as a polymerization inhibitor.

It has now been discovered that unsaturated nitrogenous bases may be polymerized or copolymerized satisfactorily if they are exposed to high energy ionizing radiation. The term "high energy ionizing radiation" is intended to include alpha-rays, beta-rays, gamma-rays, neutron fluxes and X-rays, having an energy above 30 ev. and of sufficient intensity that the dose rate is at least 100 equivalent roentgens per hour. This excludes radiation such as cosmic and ultraviolet.

In practice mixtures of such radiation are used in which one type may predominate. The polymers produced by the process of the present invention are particularly useful as additives for lubricating and fuel oils.

One useful source of ionizing radiation is a thermal nuclear reactor operating at a power level of about 3 megawatts. This type of reactor produces a very intense flux of thermal neutrons mixed with high energy neutrons and gamma rays.

Another convenient and preferred source of ionizing radiation is a radio-active substance which emits alpha, beta, or gamma rays. For example, cobalt 60 is a very convenient source of gamma rays.

Also useful are linear and travelling wave accelerators which give high energy beta rays.

The unsaturated nitrogenous base which is used according to the present invention is an aliphatic or aromatic primary, secondary, tertiary or cyclic amine. Suitable compounds have the following general formulae:

(1) 
$$R—NH_2$$

wherein R is an unsaturated aliphatic or aromatic hydrocarbon radical, preferably having 2 to 18 carbon atoms, such as allylamine and its homologs.

(2) 
$$R_1—NH—R_2$$

wherein one or both of the $R_1$ and $R_2$ groups are unsaturated aliphatic or aromatic hydrocarbon groups preferably each group containing 2 to 18 carbon atoms. Preferred substances include vinyl-allylamine, vinylethyl amine and 5-azo-undecene-1.

(3) 
$$R_3—N—R_5$$
$$|$$
$$R_4$$

wherein any or all the $R_3$, $R_4$, and $R_5$ groups are unsaturated hydrocarbon groups each having preferably 2 to 18 carbon atoms. Preferred compounds include vinyl di-ethyl ammonia, di-allyl amylammonia and vinyl diallyl ammonia.

(4) 
$$R_6—R_7$$

wherein $R_6$ is a basic heterocyclic aromatic group wherein the only hetero-element is nitrogen, and wherein $R_7$ is an unsaturated hydrocarbon group; the group $R_6$ may contain up to 3 nitrogen atoms and it may have saturated hydrocarbon substituent groups. The preferred compounds include 2-vinylpyridine, 2-vinyl 5-ethyl pyridine, 2-allyl pyrimidine, 4-vinyl pyrimidine, vinyl piperazine, 2-allyl pyrazine, 2-allyl purine, 2-vinyl 8-ethyl purine, 2-vinyl pyrroline and 2-allyl-4-ethyl pyrrolidine.

The unsaturated nitrogenous base can be copolymerized by the process of the present invention with one or more organic compounds. Thus esters are used as copolymers which contain an ethylenically unsaturated carbon-to-carbon linkage, particularly of the type

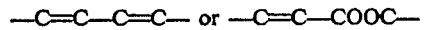
$$—C=C—C=C— \text{ or } —C=C—COOC—$$

The esters can be derived from $C_2$ to $C_4$ mono and dicarboxylic acids, particularly from maleic and fumaric acids, fully esterified with $C_2$ to $C_{20}$ alkanols, particularly with natural alcohols, e.g. palm-kernel alcohols. Such esters can be derived from unsaturated alcohols, such as vinyl alcohol or from unsaturated acids.

Unsaturated hydrocarbons having at least one ethylenically unsaturated bond can be used as copolymeric materials according to the present invention. These can be $C_2$ to $C_{10}$ mono-olefins, or polymers thereof, e.g. polymerized mono-olefins such as polyethylene, or polystyrene or polyalkylstyrene. Particularly preferred polyolefins are polybutenes. The polymerized olefins are particularly useful in preparing graft polymers.

Other copolymeric compounds include copolymeric ethers, thio-ethers and acrylonitrile.

In carrying out the processes of the present invention, the monomer mixture is exposed to the radiation preferably at ambient temperature, for example about 20–25° C. The most convenient source of radiation is a radio-active chemical element. The choice of such an element will obviously depend upon the type of radiation required and the availability of the source. The preferred type of radiation is one consisting predominantly of gamma rays, and a suitable source consists of the isotope cobalt 60. This isotope has a half-life of about 5.2 years, and emits gamma rays of two different energy levels, each of about 1 mev. The isotope $Cs^{137}$ can also be used. This isotope emits a 0.66 mev. gamma ray, and has a half-life of 37 years.

Generally, the monomer mixture will comprise about 1 to 20 wt. percent of the unsaturated hydrocarbon amine and 80 tot 99 wt. percent of either unsaturated ester or unsaturated hydrocarbon. Preferred proportions are 3 to 10 wt. percent amine and 90 to 97 wt. percent of ester or hydrocarbon. The dose rate of irradiation can range from 100 to 100,000 roentgens/minute, preferably 1,000 to 50,000 roentgens/minute for a total dosage of $10 \times 10^4$ to $10 \times 10^8$, preferably $10 \times 10^5$ to $10 \times 10^7$ roentgens. In the event that the amine is gaseous, then the reaction can be carried out under pressure or at a low enough temperature to maintain the amine in a liquid state.

The polymerization is terminated before heavy crosslinking and resinification of the polymer takes place, so that adequate oil-solubility of the final product can be obtained. This control can be achieved by controlling the total integrated dose given to the system, and can also be influenced by using solvents in the polymerization mixture. The use of too high a dose, especially if accompanied by relatively high intensity, is undesirable as it may lead to polymerization of the polymer formed, e.g. cross-linking.

The present invention therefore comprises a process for polymerizing or copolymerizing an unsaturated nitrogenous base, which comprises exposing the monomers to ionizing radiation until polymerization is effected, and collecting the polymer so produced.

The present invention also comprises the polymers obtained by such processes, and solutions of such polymers obtained in lubricating and fuel oils.

The lubricating oil base stocks used in the compositions of this invention may be straight mineral lubricating oils or distillates derived from paraffinic, naphthenic, asphaltic, or mixed base crudes, or, if desired, various blended oils can be employed as well as residuals, particularly those from which asphaltic constituents have been carefully removed. The oils con be refined by conventional methods using acid, alkali and/or clay or other agents such as aluminum chloride, or they can be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil can be employed as well as synthetic oils, such as esters and polyethers as well as those prepared, for example, by the polymerization of olefins or by the reaction of oxides of carbon with hydrogen or by the hydrogenation of coal or its products. Also, for special applications, animal, vegetable or fish oils or their hydrogenated or voltolized products can be employed in admixture with mineral oils.

Synthetic lubricating oils can also be employed which have a viscosity of at least 30 S.U.S. at 100° F. such as esters of monobasic acids (e.g., ester of $C_8$ oxo alcohol with $C_8$ oxo acid, ester of $C_{13}$ oxo alcohol with octanoic acid, etc.), esters of dibasic acids (e.g., di-2-ethyl hexyl sebacate, di-nonyl adipate, etc.), esters of glycols (e.g., $C_{13}$ oxo acid diester of tetraethylene glycol, etc.), complex esters (e.g., the complex ester formed by reacting one mole of sebacic acid with two moles of tetraethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ oxo alcohol, and one mole of $C_8$ oxo acid), esters of phosphoric acid (e.g., the ester formed by contacting three moles of the monomethyl ether of ethylene glycol with one mole of phosphorus oxychloride, etc.), halocarbon oils (e.g., the polymer of chlorotrifluoroethylene containing twelve recurring units of chlorotrifluoroethylene), alkyl silicates (e.g., methyl polysiloxanes, ethyl polysiloxanes, methyl-phenyl polysiloxanes, ethyl-phenyl polysiloxanes, etc.), sulfite esters (e.g., esters formed by reacting one mole of sulfur oxychloride with two moles of the methyl ether of ethylene glycol, etc.), carbonates (e.g., the carbonate formed by reacting $C_8$ oxo alcohol with ethyl carbonate to form a half ester and reacting this half ester with tetraethylene glycol), mercaptals e.g., the mercaptal formed by reacting 2-ethylhexyl mercaptan with formaldehyde), formals (e.g., the formal formed by reacting $C_{13}$ oxo alcohol with formaldehyde), polyglycol type synthetic oils (e.g., the compound formed by condensing butyl alcohol with fourteen units of propylene oxide, etc.), or mixtures of any of the above (or with mineral oils), in any proportions, can also be used.

In the present specification, the terms "polymer" and "polymerization" are intended to cover "copolymers" and "copolymerization."

The following examples serve to illustrate the process of the present invention. Three experiments using prior art techniques were:

EXPERIMENT I

Reaction mixture: Percent by weight

Esters of maleic acid with palm-kernel alcohol (a commercial mixture of saturated $C_{10}$ to $C_{16}$ alcohols, the mixture having an average chain length of $C_{13.5}$) _____ 76.5
Vinyl acetate _____ 11.2
Allylamine _____ 11.2

The polymerization catalyst used was benzoyl peroxide in an amount 1.1% by weight.

The mixture was maintained, with continuous stirring, at 60° C. for 15 hours under reflux. At the end of this time there was no apparent change in the viscosity, indicating that substantially no polymerization had occurred.

EXPERIMENT II

Reaction mixture: Percent by weight

Esters of fumaric acid with a commercial mixture of $C_{10}$ and $C_{16}$ alcohols (as in Experiment I) _____ 74.2
Vinyl acetate_____ 18.2
2-vinyl pyridine_____ 3.8

Lauryl alcohol, in an amount of 1.9% by weight and benzoyl peroxide in an amount of 1.9% by weight were used as crosslinking inhibitor and polymerization catalyst respectively.

The reaction mixture was maintained, with stirring, at 60° C. for 24 hours under reflux. No polymerization was observed. The temperature was then raised to 70° C. and 1.0 wt. percent of 2:2′ bisazobutyronitrile was added. No polymerization could be observed after a further 24 hours.

EXPERIMENT III

Reaction mixture: Wt. percent

Lauryl methacrylate_____ 94
Allylamine _____ 4

Benzoyl peroxide (2 wt. percent) was added as polymerization catalyst. The mixture was maintained, with stirring, at 60° C. under reflux. Since it was thought that oxygen might be inhibiting the polymerization reaction, this experiment was carried out with the reaction mixture under a nitrogen blanket. No polymerization could be detected after 10 hours.

Polymerizations according to the present invention were carried out on a number of monomer mixtures.

EXPERIMENT IV

The first series, designated the "A" series, comprised 75 parts by weight of palm-kernel fumarate, 18 parts by weight of vinyl acetate, and 6 parts by weight of an unsaturated organic base such as allylamine or 2-vinyl-5-ethyl pyridine. Aliquots consisting of 200 grams of total monomer mixture and 320 grams of toluene were irradiated in sealed ampoules.

EXPERIMENT V

A further series, designated the "B" series, consisted of a mixture of equal parts by weight of polybutene, having 6.7 mole percent unsaturation and a molecular weight (Staudinger) of 40,000, and cetane, to which mixture was added 5 wt. percent of amine, based upon the weight of polybutene. Aliquots of the final mixture were then irradiated.

In all instances, the polymerization was effected by subjecting the polymeric mixture to the radiation from a cobalt 60 source, at a temperature of from 15-20° C. The dose rate was 2500 roentgens/min., and the total dose varied between 8.7 to $8.9 \times 10^6$ roentgens.

In the A Series, the sealed glass ampoules were opened and stripped to constant weight at room temperature, after irradiation, by connection to a vacuum line and cold trap. This removed all unpolymerized volatile material, including toluene diluent, but is unlikely to have removed any unreacted "palm kernel" fumarate. The residue was used to make up blends in SAE 30 mineral oil by weight.

In B Series, the mixture was also stripped to constant weight, it being observed that very little, if any, weight loss occurred. Under these conditions, it may be assumed that no appreciable quantity of cetane was lost. The residue was then used to prepare the SAE 30 mineral oil blends by weight.

In all instances, the polymeric mixture polymerized satisfactorily. The various polymer residues obtained above were then dissolved in an SAE 30 mineral oil to determine the effect of the polymers produced by the process of the present invention on the oil. The dispersancy of the oil solution is a function of the volume percent of dry used engine oil sludge that the solution would maintain in suspension, after 2 hours at 200° F., using 10 grams of dried used oil sludge and 90 grams of the oil blend.

The results of the above examples are shown in Table I.

Table I

| Series No. | N-Containing Monomer | Diluent | Wt. percent Additive in SAE 30 Mineral Oil | Dispersancy, Vol. percent | V.I. | Pour Point, °F. |
|---|---|---|---|---|---|---|
| A1 | Allylamine | Toluene | Nil | 2 | 102 | +15 |
| A2 | do | None | 3.6 | 18 | 105½ | 0 |
| A3 | 2-Vinyl-5-ethyl pyridine | Toluene | 5.0 | 12.5 | 104 | −10 |
|  |  |  | 4.3 | 80 | 104 | −5 |
| B1 | Allylamine | Cetane | 5.0 | 70 | 115½ | +20 |
| B2 | 2-Vinyl-5-ethyl pyridine | do | 5.0 | 80 | 123 |  |

Experiments I, II and III demonstrate that mixtures containing unsaturated nitrogenous bases are remarkably difficult to polymerize. The base acts as a polymerization inhibitor because, for example, the other components of Experiments I, II, and III are known to polymerize readily in the absence of the base.

In the presence of ionizing radiation, however, polymerization of unsaturated nitrogenous bases was effected as can be seen by Experiments IV and V.

It will be noted that these examples show the polymers of the present invention donate useful properties when included in lubricating oils such as mineral oils. In all instances, the detergency is increased and in most cases V.I. is also increased, and the pour point lowered.

It will be understood that the preceding examples are given for illustrative purposes only and that various modifications and variations may be made therein without departing from the spirit or scope of the invention.

What is claimed is:

1. A method of producing oil-soluble copolymers which comprises exposing a mixture of 1 to 20 wt. percent of an unsaturated hydrocarbon amine containing 2 to 18 carbon atoms per molecule and about 80 to 99 wt. percent of an unsaturated polymerizable material selected from the group consisting of esters of unsaturated $C_2$ to $C_4$ carboxylic acids fully esterified with $C_2$ to $C_{20}$ alkanols, and esters of saturated $C_2$ to $C_4$ carboxylic acids fully esterified with vinyl alcohol, to ionizing radiation comprising gamma rays of an intensity and for a duration sufficient to effect co-polymerization and within the dose rate of about 100 to 100,000 roentgens per minute and within a total dosage of $10 \times 10^4$ to $10 \times 10^8$ roentgens.

2. A method according to claim 1, wherein said amine is an unsaturated aliphatic primary amine and said unsaturated polymerizable material is a mixture of an ester of a $C_4$ unsaturated dicarboxylic acid and vinyl acetate.

3. A method according to claim 1, wherein said amine contains a heterocyclic aromatic group wherein the only hetero-element is nitrogen and an unsaturated hydrocarbon group.

4. A method according to claim 1, wherein said amine is a pyridine and said unsaturated polymerizable material is a mixture of alkyl fumarates and vinyl acetate.

5. A method of producing oil-soluble copolymeric materials useful as lubricating oil additives which comprises exposing a mixture of about 6 parts by weight of an unsaturated hydrocarbon amine having not more than 18 carbon atoms per molecule, about 18 parts by weight of vinyl acetate and about 75 parts by weight of the fumarate of $C_{10}$ to $C_{18}$ mixed saturated palm-kernel alcohols, to a total dosage of about $9 \times 10^6$ roentgens of ionizing radiation comprising predominantly gamma rays and recovering a copolymeric material produced by said radiation.

6. A method of producing oil-soluble additive material which comprises exposing at a temperature of from 15° to 20° C. a mixture of 18 parts by weight of vinyl acetate, 6 parts by weight of allylamine and 75 parts by weight of the fumarate of $C_{10}$ to $C_{18}$ mixed saturated palm-kernel alcohols to a total dosage of about $9 \times 10^6$ roentgens of ionizing radiation comprising gamma rays and collecting the additive material so produced.

7. A method according to claim 1, wherein the amount of said amine is 3 to 10 wt. percent, the amount of said unsaturated polymerizable material is 90 to 97 wt. percent, the dose rate of said radiation is 1,000 to 50,000 roentgens per minute and the total dosage is $10 \times 10^5$ to $10 \times 10^7$ roentgens.

8. A method according to claim 1, wherein said ester is a $C_2$ to $C_4$ carboxylic acid fully esterified with a $C_2$ to $C_{20}$ alkanol.

References Cited in the file of this patent
UNITED STATES PATENTS

| | | |
|---|---|---|
| 2,837,496 | Vandenberg | June 3, 1958 |
| 2,921,006 | Schmitz et al. | Jan. 12, 1960 |

FOREIGN PATENTS

| | | |
|---|---|---|
| 546,816 | Belgium | Oct. 6, 1956 |

OTHER REFERENCES

Ballantine et al.: Brookhaven National Laboratory Report 414, October 1956, pp. 1–14.